United States Patent
Estes (10) Patent No.: US 10,159,221 B1
(45) Date of Patent: Dec. 25, 2018

(54) ANIMAL CONDITIONING AND TRAINING APPARATUS

(71) Applicant: Lloyd F. Estes, Springtown, TX (US)

(72) Inventor: Lloyd F. Estes, Springtown, TX (US)

(*) Notice: Subject to any disclaimer, the term of this patent is extended or adjusted under 35 U.S.C. 154(b) by 0 days.

(21) Appl. No.: 15/626,056

(22) Filed: Jun. 16, 2017

Related U.S. Application Data (60) Provisional application No. 62/351,075, filed on Jun. 16, 2016.

(51) Int. Cl.
*A01K 15/02* (2006.01)
*A01K 29/00* (2006.01)

(52) U.S. Cl.
CPC .......... *A01K 15/027* (2013.01); *A01K 29/005* (2013.01)

(58) Field of Classification Search
CPC ...... A01K 15/02; A01K 15/027; A45B 17/00; A45B 2017/005; A45B 2023/0075
See application file for complete search history.

(56) References Cited

U.S. PATENT DOCUMENTS

| | | | | |
|---|---|---|---|---|
| 195,244 A | * | 9/1877 | Slbin | A01K 15/027 185/21 |
| 583,661 A | * | 6/1897 | Smith | A01K 15/027 119/700 |
| 877,504 A | * | 1/1908 | Hoover | A01K 15/027 119/701 |
| 1,565,484 A | * | 12/1925 | McWhirter | A63B 22/18 482/146 |
| 1,956,937 A | * | 5/1934 | Van Kleek | A01K 15/027 119/701 |
| 2,707,465 A | * | 5/1955 | Nemeth | A61H 1/0292 482/146 |
| 3,462,140 A | * | 8/1969 | Halaj | A63G 1/12 472/18 |
| 3,716,029 A | * | 2/1973 | Pillsbury, Jr. | A01K 15/027 119/701 |
| 3,981,274 A | * | 9/1976 | Curtis | A01K 15/027 119/701 |

(Continued)

FOREIGN PATENT DOCUMENTS

| | | | | |
|---|---|---|---|---|
| DE | 202018000974 U1 | * | 3/2018 | A45B 17/00 |
| FR | 1058782 A | * | 3/1954 | A01K 15/027 |

(Continued)

OTHER PUBLICATIONS

Machine translation of FR 2805713 to Buj, dated Sep. 2001.*

*Primary Examiner* — Kathleen I Alker
(74) *Attorney, Agent, or Firm* — Law Office of Sam Sokhansanj, PLLC (57) ABSTRACT

An automated and motorized animal conditioning device that can be configured to tilt or pivot relative to a foundation or base. A shaft can be integrated into the animal conditioning device and configured to rotate via a serviceable motor, gears, and chain mechanism. Further, as the shaft rotates, arms emanating from a supporting structure of the conditioning device can continuously change angles relative to the ground. Further, a tether, cable, or other such object can be attached to an arm so that an animal connected to it is encouraged to move as the arm rotates. Here, the continuous changing of the arm's angle allows an animal either tethered to, or moving in between panels, to move more naturally without being confined to a strictly defined path.

14 Claims, 11 Drawing Sheets

(56) References Cited

U.S. PATENT DOCUMENTS

| | | | |
|---|---|---|---|
| 4,275,686 A | 6/1981 | MacGillivray | |
| 4,766,848 A | 8/1988 | Rocco et al. | |
| 4,878,509 A * | 11/1989 | Tung | A45B 17/00 135/20.3 |
| 4,978,120 A * | 12/1990 | Greenwood | A63G 1/20 297/274 |
| 5,437,246 A * | 8/1995 | Noles | A01K 1/04 119/785 |
| 6,213,056 B1 | 4/2001 | Bergmann et al. | |
| 6,390,107 B1 * | 5/2002 | Lin | A45B 19/10 135/15.1 |
| 6,446,650 B1 * | 9/2002 | Ma | A45B 17/00 135/20.3 |
| 6,575,182 B2 * | 6/2003 | Tung | A45B 17/00 135/20.1 |
| 6,575,183 B2 * | 6/2003 | Tung | A45B 17/00 135/20.3 |
| 7,128,076 B2 * | 10/2006 | Freedman | A45B 11/00 135/20.3 |
| 7,156,054 B1 | 1/2007 | York | |
| 7,406,976 B1 * | 8/2008 | Chan | A45B 25/14 135/16 |
| 7,412,985 B2 * | 8/2008 | Ma | A45B 17/00 135/20.1 |
| 7,431,259 B2 * | 10/2008 | Tung | A45B 17/00 135/20.3 |
| 7,497,225 B1 * | 3/2009 | Klein, Jr. | A45B 3/00 135/118 |
| 7,926,496 B2 * | 4/2011 | Young | A45B 11/00 108/50.12 |
| 8,534,304 B1 * | 9/2013 | Tung | A45B 17/00 135/16 |
| 8,763,620 B1 * | 7/2014 | Tung | A45B 25/14 135/20.1 |
| 9,155,364 B2 * | 10/2015 | Jason | A45B 17/00 |
| 9,528,313 B1 * | 12/2016 | Arimilli | E04F 10/02 |
| 9,565,907 B2 * | 2/2017 | Ma | A45B 25/02 |
| 9,615,637 B1 * | 4/2017 | Tung | A45B 25/14 |
| 9,949,540 B2 * | 4/2018 | Gharabegian | A45B 25/00 |
| 2003/0017922 A1 * | 1/2003 | Sachs | A63B 26/003 482/146 |
| 2005/0072375 A1 * | 4/2005 | Mazrolle | A01K 15/02 119/702 |
| 2008/0173254 A1 | 7/2008 | Townsend et al. | |
| 2008/0257277 A1 * | 10/2008 | Smith | A01K 15/027 119/704 |
| 2009/0137328 A1 * | 5/2009 | Wingerstahn | A63G 1/12 472/14 |
| 2010/0006038 A1 * | 1/2010 | Matui | A01K 15/027 119/725 |
| 2011/0265836 A1 * | 11/2011 | Wilkins | A45B 3/02 135/16 |
| 2014/0041555 A1 * | 2/2014 | Ramberg | F16M 13/022 108/50.12 |

FOREIGN PATENT DOCUMENTS

| | | | | |
|---|---|---|---|---|
| FR | | 2238449 A1 * | 2/1975 | A45B 17/00 |
| FR | | 2805713 A1 * | 9/2001 | A01K 15/027 |
| WO | WO-2016021797 A1 * | | 2/2016 | A45B 17/00 |

* cited by examiner

ANIMAL CONDITIONING AND TRAINING APPARATUS

CROSS REFERENCE TO RELATED APPLICATIONS

This application claims the benefit of U.S. Provisional Application No. 62/351,075 filed on Jun. 16, 2016, which is incorporated herein by reference in its entirety.

BACKGROUND

This section is intended to introduce the reader to aspects of art that may be related to various aspects of the present disclosure described herein, which are described and/or claimed below. This discussion is believed to be helpful in providing the reader with background information to facilitate a better understanding of the various aspects of the present disclosure described herein. Accordingly, it should be understood that these statements are to be read in this light, and not as admissions of prior art.

Animal and equine owners use horse walkers or similar conditioning devices to train and to exercise animals. Over time, owners have observed these devices' limitations and have sought to improve them to enhance safety, ease of use, and portability.

One problem with traditional designs is that they often limit an animal to unnatural or fixed movements, such as forcing it to move in a strictly defined circular path. Another problem arises when a device forces an animal to continue moving forward at a rigid constant speed, thereby potentially causing head or neck injuries to the animal. Finally, some conditioning devices are designed so that their serviceable components are integrated or fixed to the body, thereby making maintenance and serviceability difficult.

Although prior devices have attempted to overcome some of these problems, disadvantages still remain. For example, the arms of prior devices are still restricted to, at most, a few fixed positions during operation. Also, components of some prior devices are difficult to retrieve for service, since they are usually either integrated into the device or positioned so that several steps are required to remove them. Moreover, prior devices are assembled and mounted on flat terrain, limiting an animal to using only certain muscle groups, resulting in underdeveloped animals. Indeed, animals that train only on flat terrain often become bored, resistant, or agitated. Over time, underdeveloped animals may pose financial risks to a trainer or to an owner. In addition, replacing the original exercise device with a new device would generally require a new foundation base and new underground cabling to be performed. Finally, components are often left exposed, increasing maintenance needs and creating unwanted noise.

Hence, what is needed is an automated animal conditioning device that allows an animal to move as freely as possible on various types of terrain to promote better conditioning of the animal. It should also protect serviceable components from the elements while allowing an operator to retrieve them in as few steps as possible. Additionally, such a device should have the capability to be installed onto and integrated with existing foundation bases and underground cabling. To that end, as the device is modular in design, it should be adaptable and allow for components to be replaced, added, or substituted as necessary for achieving one of several desired configurations.

BRIEF SUMMARY

In one aspect of the disclosure described herein, a motorized animal conditioning device can be coupled with a pivoting platform secured to a foundation base. A shaft can be integrated into the conditioning device and made to rotate by a gear and chain mechanism. Here, as shaft rotates, arms emanating from a supporting structure of the conditioning device can continuously change angles relative to the ground. A tether, cable, gate, panel, or other such object can be attached to an arm so that an animal connected to it is encouraged to move as the arm rotates. Here, by continuously changing the arm's angle allows an animal tethered to it to move more naturally without being confined to a strictly-defined path. As the arm descends, the tether's increased slack allows the animal to choose its path. As the arm ascends and slack decreases, the animal is gradually guided forward to encourage it to move in a loosely-defined circular path. This way, the animal can be pulled gradually instead of being jerked abruptly. Alternatively, such a device may be used without a pivoting platform. In that case, the arms of the device would either remain at fixed positions relative to the ground, or they would utilize an additional motorized mechanism to change positions along the supporting structure, such as sliding up and down periodically.

Aside from tethering an animal, a device's arms may instead support revolving gates or panels. In such a configuration, an animal may move freely within a bounded area bordered by a revolving gate in front of the animal, a revolving gate behind the animal, and an inside and an outside gate on either side of the animal. An outside gate may form a continuous circle with a radial distance from the conditioning device, such as 150 feet. By extension, tethers may be combined with revolving gates or panels in the same apparatus. Further, a roof may be allowed to cover the device, horses, and entire bounded area. Such a roof may take a shape, such as octagonal, and may be removable as the desired configuration changes.

In another aspect of the disclosure described herein, a motor unit of the animal conditioning device can be mounted between two plates, which may be secured to a support structure. The motor unit can detach from the plates by removing fasteners and sliding it out. When the motor unit is one mobile unit, detachable from the rest of the device, it may be retrieved easily for service. After service, the motor unit can slide back into place and can be reattached by securing fasteners.

In an another aspect of the disclosure described herein, the gear and chain mechanism may be encased by a sprocket cover system. The sprocket cover system can protect the gear and chain mechanism from the elements, reducing the effect of air on its operation and on its required maintenance.

Further, the animal conditioning device may be installed onto an existing foundation base and integrated with existing underground cabling. As a result, when a foundation base and underground cabling already exist, the animal conditioning device can be used without having to replace them. By extension, the device may be used on any elevation slope, flat terrain, or compound angle terrain. In effect, the device may be considered modular in design, as existing parts from other devices may be used with it, and as it can accommodate a variety of configurations by switching out components.

In another aspect of the disclosure described herein, an animal conditioning apparatus is disclosed having an upright base with a first mounting interface, a top shaft having a plurality of arms extending radially outward from the top shaft, and a lower shaft or post coupled to the top shaft, wherein the lower shaft further comprises a second mounting interface. Here, the first mounting interface can be configured to couple to the second mounting interface at an angle. In addition, the lower shaft is in a tilted configuration relative to the upright base. Further, a drive motor unit can be secured to the lower or upper shaft, and a drive belt or chain can be configured to drive and rotate the top shaft. In addition, a housing can be provided to at least partially enclose the drive belt or chain. The animal conditioning apparatus may also include a first spacer and a second spacer between the first and second mounting interfaces. Here, the first spacer can be taller than the second spacer so that the upper shaft is tilted. In addition, the animal conditioning apparatus may also include a pivoting hinge between the first and second mounting interfaces, or a wedge or angled block between the first and second mounting interfaces.

In another aspect of the disclosure described herein, an animal conditioning apparatus is disclosed having a first mounting interface, a top shaft having a plurality of arms extending radially outward from the top shaft, and a bottom shaft coupled to the top shaft, wherein the bottom shaft further comprises a second mounting interface. Here, the first mounting interface can be configured to couple to the second mounting interface, and a motor unit secured to a side of the bottom shaft, wherein the motor unit is configured to pivot outward. Here, the bottom shaft can be in a tilted configuration relative to a horizontal plane, and the plurality of arms can be further connected to one or more panels. In addition, the plurality of arms can be further connected to one or more tethers. Further, apparatus can include a housing for at least partially enclosing the motor unit, and a hinge between the first mounting interface and second mounting interface.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which.

DETAILED DESCRIPTION

In the Brief Summary of the present disclosure above and in the Detailed Description of the disclosure described herein, and the claims below, and in the accompanying drawings, reference is made to particular features (including method steps) of the disclosure described herein. It is to be understood that the disclosure of the disclosure described herein in this specification includes all possible combinations of such particular features. For example, where a particular feature is disclosed in the context of a particular aspect or embodiment of the disclosure described herein, or a particular claim, that feature can also be used, to the extent possible, in combination with and/or in the context of other particular aspects and embodiments of the disclosure described herein, and in the disclosure described herein generally.

The embodiments set forth below represent the necessary information to enable those skilled in the art to practice the disclosure described herein and illustrate the best mode of practicing the disclosure described herein. In addition, the disclosure described herein does not require that all the advantageous features and all the advantages need to be incorporated into every embodiment of the disclosure described herein.

Phrases and terms similar to "software", "application", and "firmware" may include any non-transitory computer readable medium storing thereon a program or algorithm, which when executed by a computer, causes the computer to perform a method, process, or function. Phrases and terms similar "network" may include one or more data links that enable the transport of electronic data between computer systems and/or modules. When information is transferred or provided over a network or another communications connection (either hardwired, wireless, or a combination of hardwired or wireless) to a computer, the computer uses that connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Figure 1:
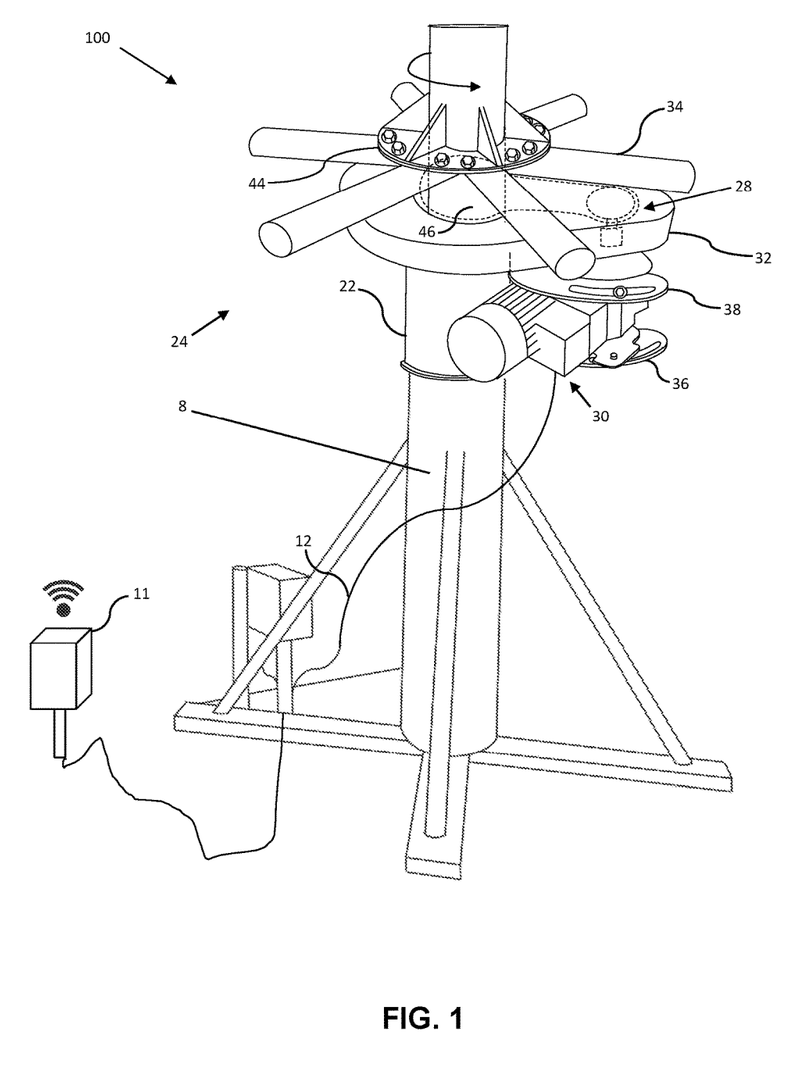
FIG. 1 illustrates a perspective view of one non-limiting embodiment of the animal conditioning device of the disclosure described herein.

FIG. 1 illustrates one non-limiting embodiment of an animal conditioning apparatus 100 of the disclosure described herein. In particular, an animal conditioning device 24 can be coupled with a foundation base 8 by securing a supporting shaft 22 to it via one or more fasteners, such as nuts and bolts, rivets, or spot-welds. The foundation base 8 may be of any shape or size that allows it to couple with and provide support to a rotating shaft 46, motor unit 30, arms 34, among others. An existing controller 11 and existing wires 12 may be integrated with the conditioning device 24 for electrical power and operation. In other embodiments, the controller 11 may be positioned at a distance away from the apparatus 100, such as several feet away. In such an embodiment, existing cabling or wire 12 may be embedded underground but still operational with respect to controlling the apparatus 100. Alternatively, the animal conditioning unit 24 and controller 11 may also be configured to operate and communicate wirelessly with each other. Further, an owner may control the apparatus 100 with radio frequency (RF) devices. Optional control settings include, but are not limited to: start, stop, speed increase, speed decrease, tilt angle increase, or tilt angle decrease.

Still referring to FIG. 1, plates 36 and 38 can be attached to the supporting post or shaft 22 so that a detachable motor unit 30 may be slid into or out of place. A gear and chain mechanism 28, which may be encased by a sprocket cover enclosure 32, enables shaft 46 to rotate. Here, shaft 22 is configured to not rotate, and provides support and secures rotating shaft 46, such as being coupled to shaft 22 but still allowing shaft 46 to freely rotate. In an alternative embodiment shaft 22 and shaft 46 may both rotate together. Referring back, as shaft 46 rotates, arms 34, which may radially extend from rotating shaft 46, may also rotate. The arms 34 may be further supported and held in place by a support structure 44. Such a support structure 44 may be made of metallic or composite plates, which can be coupled with a supporting member such as a cylindrical block, a square block, or a domed block. Alternatively, the arms may be fixed to the rotating shaft 46 without using a support structure 44. In that case, the arms 34 may be prefabricated to be part of the rotating shaft 46. In addition, the arms 34 may also be welded to the rotating shaft 46, or they may be shortened to be of a pre-defined length.

In other embodiments, the motor unit 30 may be mounted directly onto the conditioning device 24 by using supporting shaft 22 that has been prefabricated to include a mounting surface interface for motor unit 30, such as a custom-made enclosure accommodating the motor unit 30, or a surface equipped with an adhesive to secure the motor unit 30. In addition, the arms 34 of the animal conditioning apparatus may be from 1 to 100. The arms 34 may be tubular or non-tubular and being either long or short. For example, the arms 34 might be several feet long, be tubular, square, or triangular in shape, or be adjusted to provide a span, such as from 6 inches to 150 feet. Moreover, arms 34 may be constructed so that they may receive tethers, rods, cables, or other such pieces of equipment. In an embodiment using gates or panels, windscreens may be used to cover them. Similarly, in a configuration covered by a roof, all or part of the total area may be covered by a windscreen.

Figure 1A:
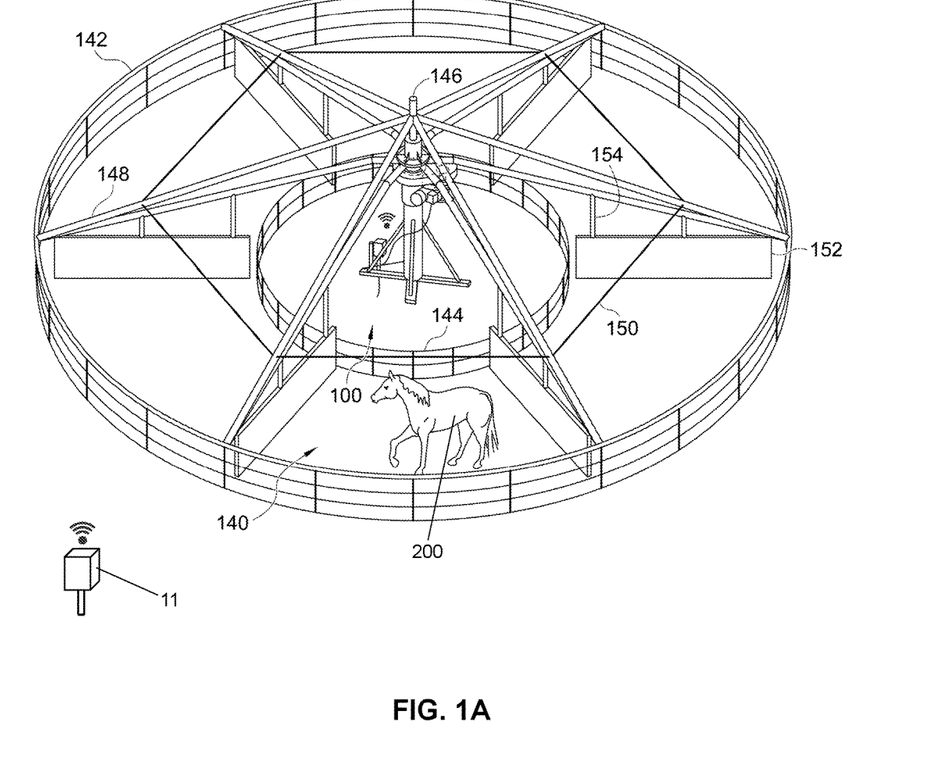
FIG. 1A illustrates a perspective view of one non-limiting embodiment of the disclosure described herein, further illustrating the animal conditioning device in operation with the use of panels or gates emanating from the device.

FIG. 1A depicts one non-limiting embodiment of a configuration of the apparatus 100 that uses revolving gates or panels instead of tethers. Rods or other such pieces may emanate from the arms of apparatus 100, and panels 152 may be secured to the rod with chains or rods 154. A support rod 148 may emanate from a mast 146 secured to the apparatus 100, further supporting the revolving panels 152. Cables 150 can provide additional support and help to redistribute force throughout the revolving gate system. An inner fence 144 and an outer perimeter fence 142, along with revolving panels 152, create a bounded area 140 for an animal to move within. Here, in the embodiment of FIG. 1A, conditioning device 24 of apparatus 100, having panels 152, may also be configured to tilt or pivot at an angle relative to a horizontal or graded plane.

In particular, in other embodiments of the apparatus 100 in relation FIG. 1A, when the apparatus is installed on a slope, grade, or hill (such as from a 1% up to 60% grade), the apparatus may require at least two cables from the main column, one for the inverse gusset, the other to control the traveling barrier panel. Here, inertia, wind, and slope angle are all factors in the conditioning of the animal. The traveling barrier panel should remain in a vertical upright configuration while maintaining a margin of clearance from the circumference fence on each side of the traveling panel. The bottom of the traveling panel can have a greater margin than the sides, but not so great that it runs over the animal or horse. However, it is expected that the animal may lay down from time to time. In such a scenario, the electronics, gear ratios, and rate of starting acceleration are considered within the scope of the disclosure described herein. In particular, a calculated force of approximately 108 lb. ft. can be available at the outside length of the arms. This force can be the sum total force, which may be divided by the arms of the apparatus, or any single arm, as work force is required. Here, once the 108 lb. ft. load is exceeded for 15 seconds, the motor drive code will default for 15 seconds, or as programmed, then automatically reset for a total of 5 times before going into default interrupt, and requiring an operator reset.

Figure 2:
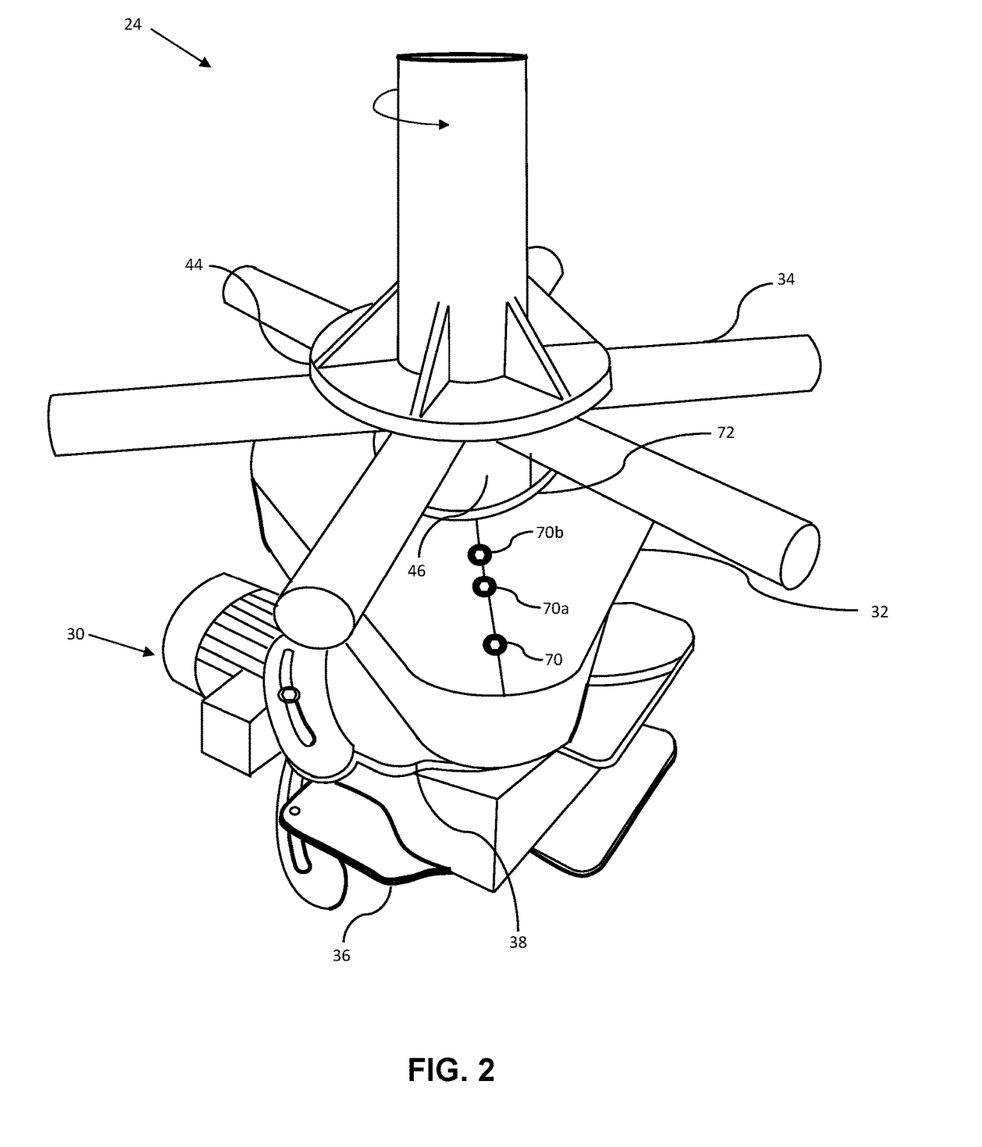
FIG. 2 illustrates a top perspective view of the animal conditioning device of the disclosure described herein.

Referring to FIG. 2 of animal conditioning device 24, an opening or gap 72 separates the vertical shaft 46 and the opening of sprocket cover enclosure 32 that can allow the shaft 46 to rotate freely. Here, cover 32 may be held together by the use of fasteners 70, 70a, and 70b, such as nuts and bolts, screws, or adhesives. Here, cover 32 generally covers and encases part of the motor unit 30, gears, sprockets, chain/belt, and other similar drive components.

Figure 3:
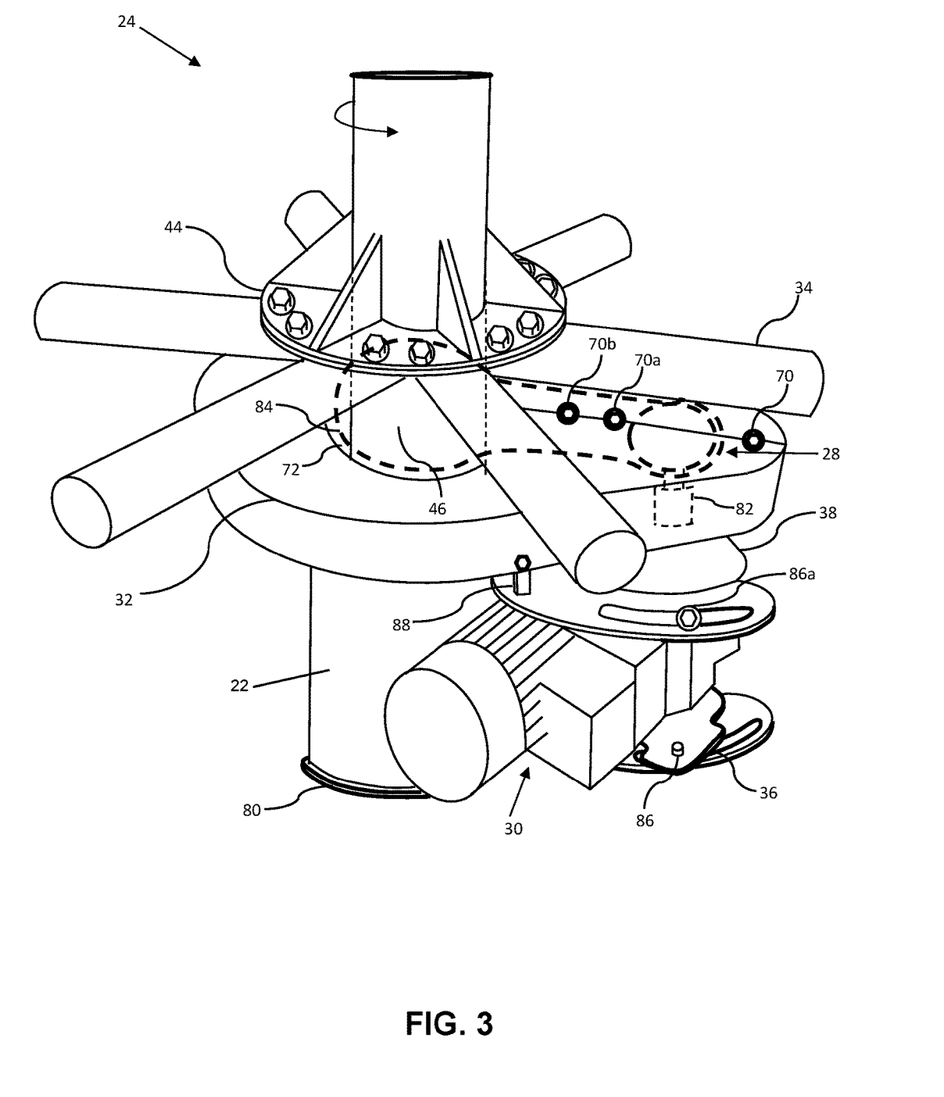
FIG. 3 illustrates side perspective view of the animal conditioning device of the disclosure described herein.

FIG. 3 further illustrates one possible position of cover 32 relative to other components of conditioning device 24 of the disclosure described herein. For example, cover 32 may be positioned so that it encases a gear and chain mechanism 28 and may be further held in place by use of a connector 88. The cover 32 may take the general shape of the gear and chain mechanism 28, or it may assume other shapes, such as rectangular, spherical, or inverted pyramidal. In addition, a larger-sized cover may be designed so that it encases more components of the conditioning device 24, such as the motor unit 30, the arms 34, or even the entire conditioning device 24. In an embodiment in which the conditioning device 24 is fully encased by cover 32, openings may be designed into the cover 32 such that they allow equipment to be hitched to, coupled to, or tethered to the device's arms 34. Additionally, cover 32 can be made of material such as metals, plastics, or composites.

Also illustrated in FIG. 3 is one possible position for placement of the motor unit 30. Here, the motor unit 30 can be mounted between two slotted plates 36 and 38. Fasteners 86 and 86a may be inserted into the slotted plates 36 and 38 to allow the motor unit 30 to pivot or to swivel with respect to the plates 36 and 38. Here, fasteners 86a can be either loosed or tightened to either allow the motor unit 30 to be pivoted out (such as for service or maintenance) or pivoted back in and secured in position. In other embodiments, the motor unit 30 may be positioned so that instead of swiveling or pivoting, it rests inside of a housing. Further, the housing or mounting plates may be sized to fit motor unit 30 with any particular frame dimensions.

Figure 4:
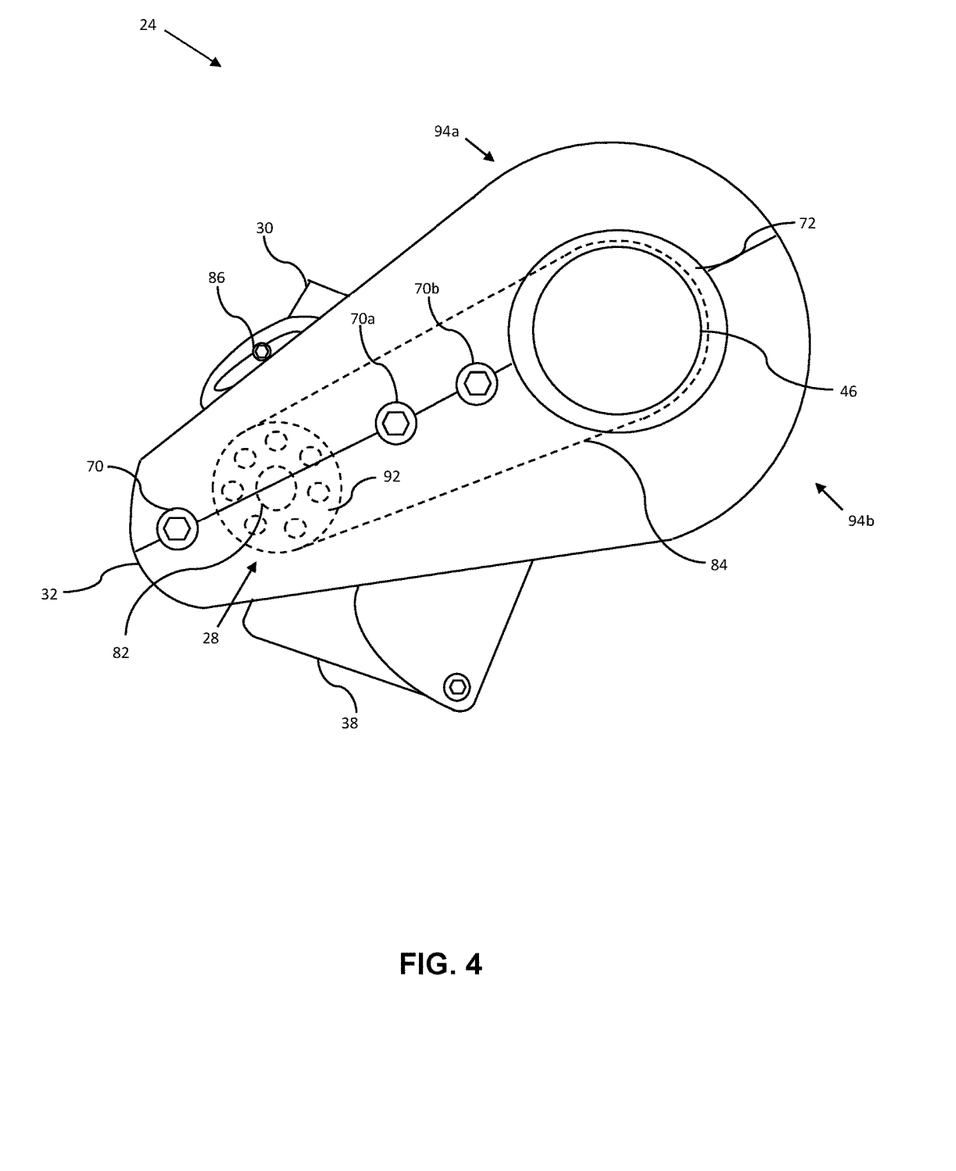
FIG. 4 illustrates a top view of the animal conditioning device of the disclosure described herein.

FIG. 4 depicts a top view of the animal conditioning device 24 of the disclosure described herein, showing one possible position of the gear and chain mechanism 28 relative to the vertical shaft 46 and sprocket cover system 32. Here, the gear and chain mechanism 28 allows shaft 46 to rotate. A drive shaft 82 may be used to drive a gear or sprocket 92, which pulls a drive belt or chain 84, such as a roller chain or detachable link chain, causing shaft 46 to rotate. Here, chain 84 may further engage teeth or a chain gear/sprocket disposed around shaft 46. Alternatively, gear and chain mechanism 28 may also be a pulley and belt mechanism, wherein chain 84 may also be a belt, and component 92 operating a drive pulley/sprocket and shaft 46 further operating as a drive pulley/sprocket.

The sprocket cover system 32 may be positioned above the gear and chain mechanism 28, shielding it from the elements. The sprocket cover system 32 may also be made up of two parts, a left side 94a and a right side 94b, which can be joined together by using fasters 70, 70a, and 70b, such as nuts and bolts, screws, or adhesives. In other embodiments, cover 32 can cover most or all components of the conditioning device 24. Also, in lieu of using a chain 84 to compel rotation, the gear 92 may instead be meshed with a perforated or toothed belt, or with another gear or set of gears. The gears may vary in size to accommodate a vertical shaft 46 having any diameter or gear ratios. In addition, the drive assembly may utilize chain/sprockets, belts, or a slewing bearing inside or outside teeth driven by a mating gear attached to a motor driven gearbox. The slewing bearing may provide a cavity for placing electrical conductors within the rotating hub. Otherwise, electrical conductor routing requires a hollow pinion shaft, thereby weakening the column support member, an issue as the radius dimension for larger systems effects the load moment.

Figure 5:
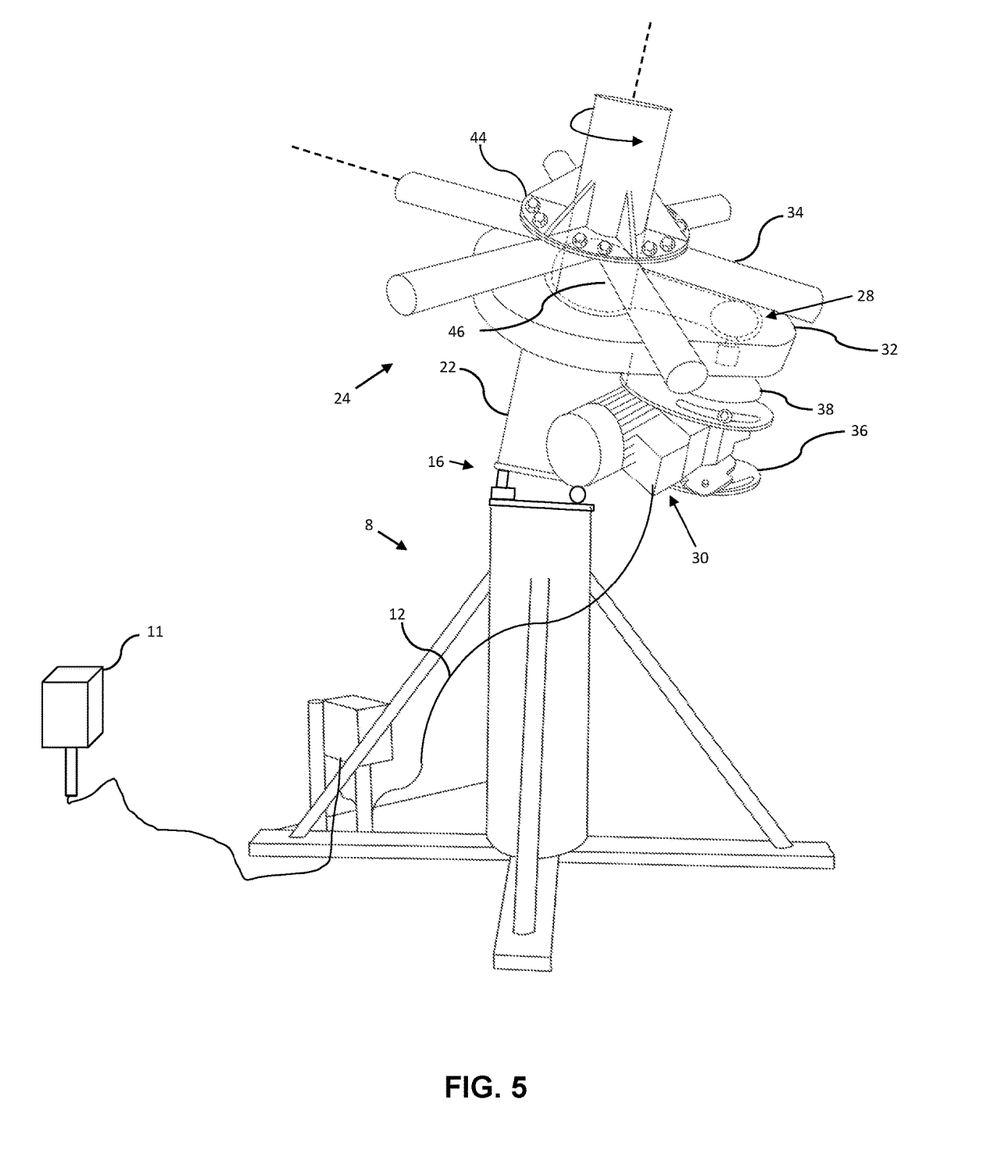
FIG. 5 illustrates a side perspective view of one non-limiting embodiment of the animal conditioning device of the present disclosure described herein in a pivoted or tilted angle configuration.

FIG. 5 illustrates another non-limiting embodiment of the conditioning apparatus of the disclosure described herein having a pivoting aspect. Specifically, a conditioning device 24 can be mounted on a pivoting platform 16 secured to a foundation base 8 via one or more fasteners, such as nuts and bolts, rivets, or spot welds. The conditioning device 24 may be situated at different angles by adjusting the pivoting platform 16. As the motor unit 30 and the gear and chain mechanism 28 compel rotation of the vertical shaft 46, the arms 34 of the conditioning device 24 also rotate, thereby continually changing angles relative to the ground, inclining and declining periodically. Here, arms 34 can be tubular in configuration and each configured to receive and secure elongated poles, pipes, or rods therein. Further, it is contemplated within the scope of the disclosure described herein, that the apparatus may include any number of arms 34, such as from 1 to 100. In other embodiments, the apparatus 500 may be mounted on a pivoting platform secured to the ground instead of being mounted on a foundation base 8. In such an embodiment, the supporting shaft 22 or the vertical shaft 46 may be of a height, in order to allow the arms 34 of the conditioning device 24 to reach a preferred height. Alternatively, the arms 34 may be connected to the vertical shaft 46 so that they do not emanate laterally, but instead emanate upward from the vertical shaft 46 at an angle. With the arms 34 configured this way, either no foundation base 8, or a shorter supporting cylinder 22, could be used.

Figure 5A:
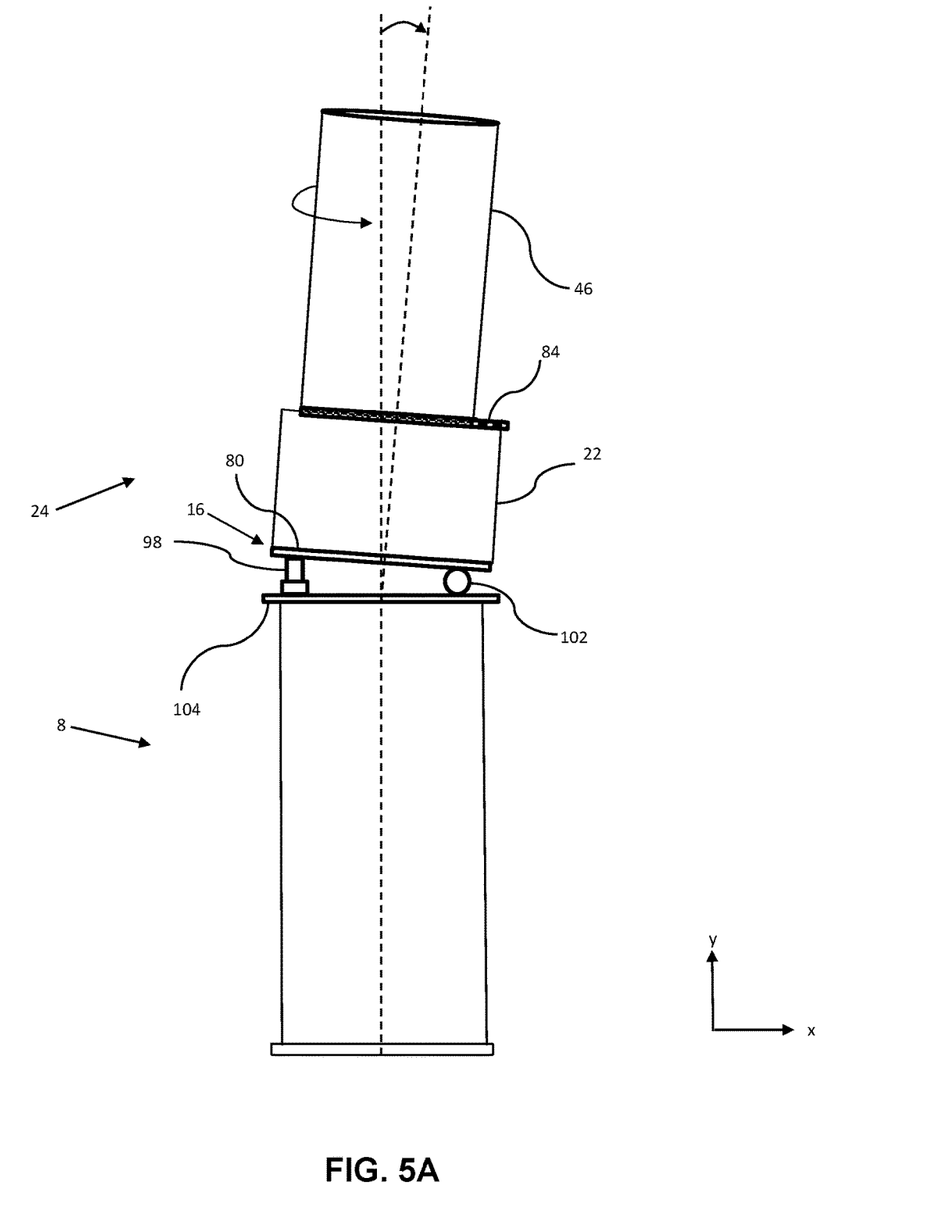
FIG. 5A illustrates a partial side view of the animal conditioning device of the disclosure described herein, further depicting the tilted configuration.

FIG. 5A shows a simplified view of one non-limiting embodiment of the pivoting aspect of the disclosure described herein. In particular, the conditioning apparatus may use a jack 98 and a hinge 102 as a pivoting platform 16 to cause the device 24 to pivot. Here, the jack 98 and the hinge 102 are secured to a top mounting plate interface 104 of the foundation base 8. A mounting plate interface 80 on the bottom of the conditioning device 24 may be secured to the jack 98 and to the hinge 102. The conditioning device 24 can assume an angled position in accordance with adjustment of the jack 98, which may be a mechanical jack or a hydraulic jack. Here, hinge 102 can allow the conditioning device 24 to assume a desired angled position while keeping the mounting plate interface 80 secure. For example, in one embodiment, the conditioning apparatus 24 may have an approximate 6 degree tilt, or from 1 degree up to 60 degrees.

Figure 5B:
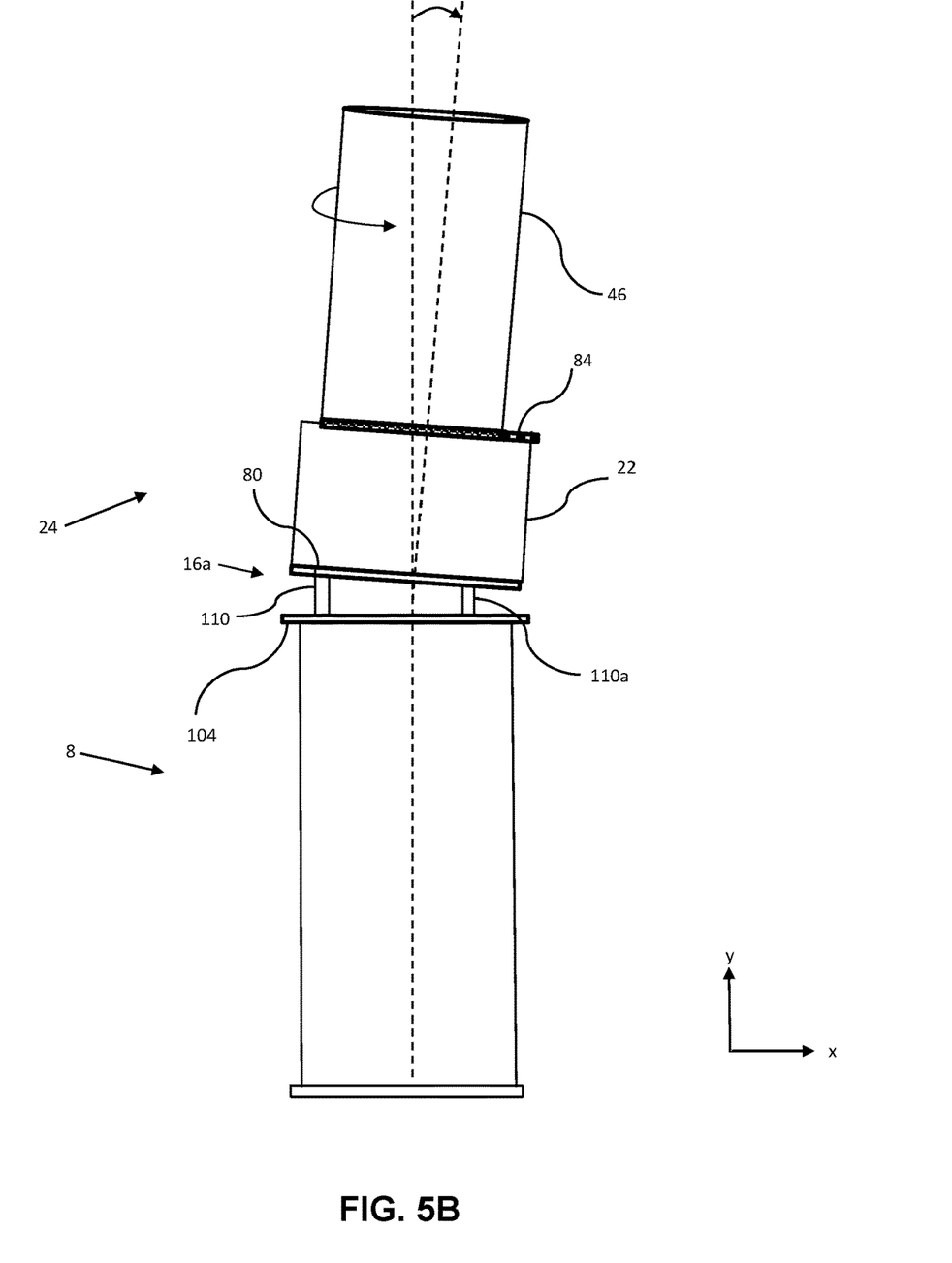
FIG. 5B illustrates a partial side view of the animal conditioning device of the disclosure described herein, showing another embodiment of the tilting configuration.

FIG. 5B illustrates another non-limiting embodiment of the pivoting aspect of the disclosure described herein. Here, a pivoting platform 16a can utilize columns or spacers 110 and 110a to angle the conditioning device 24 and fixed to the mounting plate interfaces 104 and 80. In particular, the top mounting plate interface 104 of the foundation base 8 and the mounting plate interface 80 of the conditioning device 24 can be fitted so that the two mounting plates 104 and 80 are coupled with a number of spacers 110, such as four evenly-spaced spacers 110. Spacers that differ in height, such as spacers 110 and 110a, can allow the conditioning device 24 to assume different desired angles, allowing the arms 34 of the device 24 to assume continuously changing angles relative to the ground. Alternatively, spacers can be of equal height. In that case, the conditioning device 24 would assume an upright position and would not be angled with respect to the foundation base 8. For example, in one embodiment, the conditioning apparatus 24 may have an approximate 6 degree tilt, or from 1 degree up to 60 degrees.

Figure 5C:
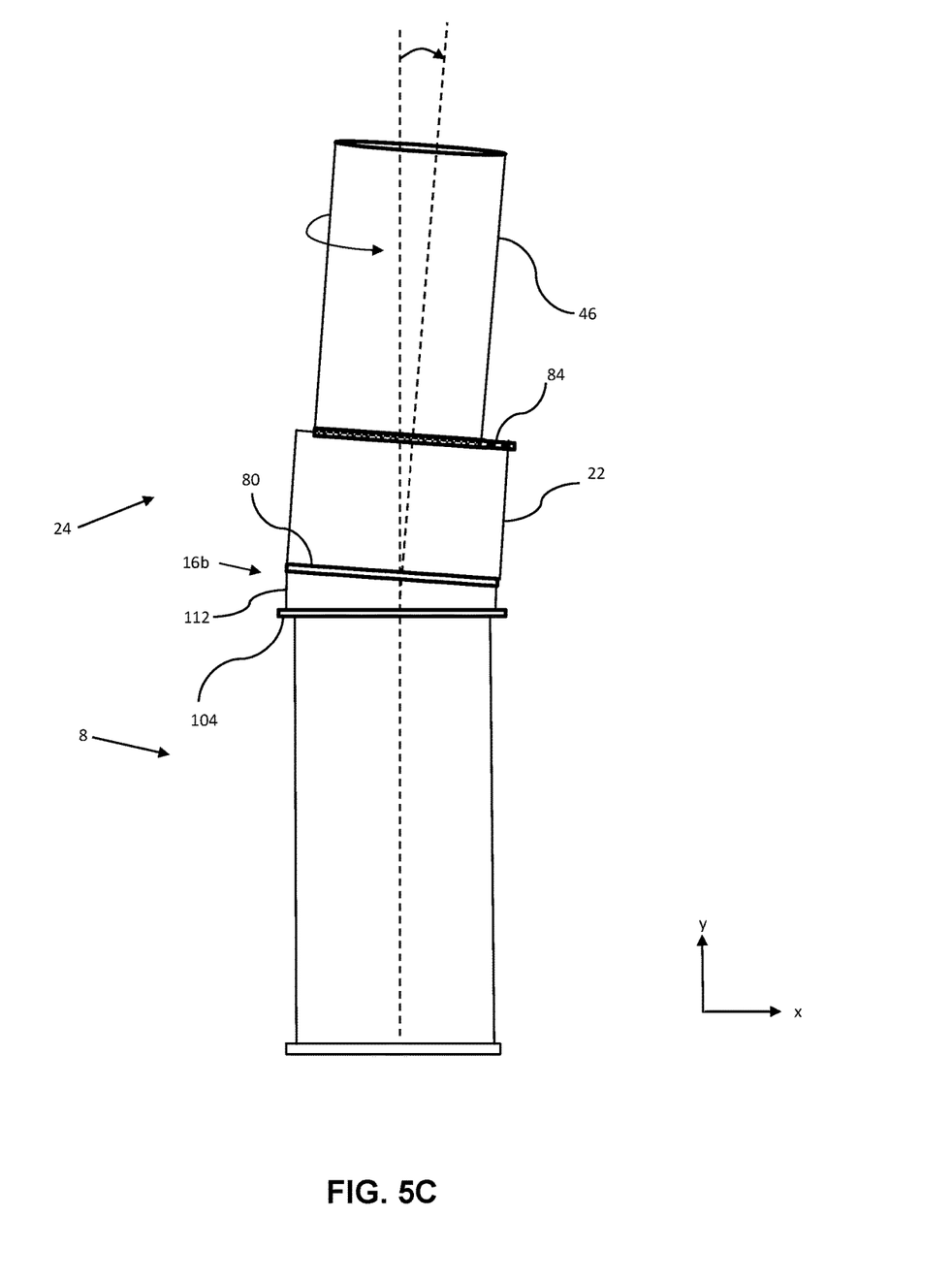
FIG. 5C illustrates a partial side view of the animal conditioning device of the disclosure described herein, showing another embodiment of the tilting configuration.

FIG. 5C illustrates another embodiment of the conditioning device 24 to be coupled at a fixed angle 16a to foundation base 8, without allowing for adjustment of the angle. In such an embodiment, a metallic or polymeric wedge block 112 can be mounted and secured to both to the top mounting plate interface 104 of the foundation base 8 such as by using spot welds, adhesives, or rivets. The conditioning device 24 can be mounted on top of and secured to the wedge 112 in the same manner, via mounting plate 80. In effect, this embodiment would still allow the arms 34 of the conditioning device 24 to assume continuously changing angles relative to the ground. Alternatively, an additional motorized mechanism may be used to allow the arms 34 to move while keeping the conditioning device 24 mounted onto the wedge 112 at a fixed angle. For example, in one embodiment, the conditioning apparatus 24 may have an approximate 6 degree tilt, or from 1 degree up to 60 degrees.

FIG. 5C illustrates another embodiment of the conditioning device 24 to be coupled at a fixed angle to foundation base 8, without allowing for adjustment of the angle. In such an embodiment, a metallic or polymeric wedge block 112 can be mounted and secured to both to the top plate 104 of the foundation base 8 such as by using spot welds, adhesives, or rivets. The conditioning device 24 can be mounted on top of and secured to the wedge 112 in the same manner, via mounting plate 80. In effect, this embodiment would still allow the arms 34 of the conditioning device 24 to assume continuously changing angles relative to the ground. Alternatively, an additional motorized mechanism may be used to allow the arms 34 to move while keeping the conditioning device 24 mounted onto the wedge 112 at a fixed angle. For example, in one embodiment, the conditioning apparatus 24 may have an approximate 6 degree tilt, or from 1 degree up to 60 degrees.

Figure 6A:
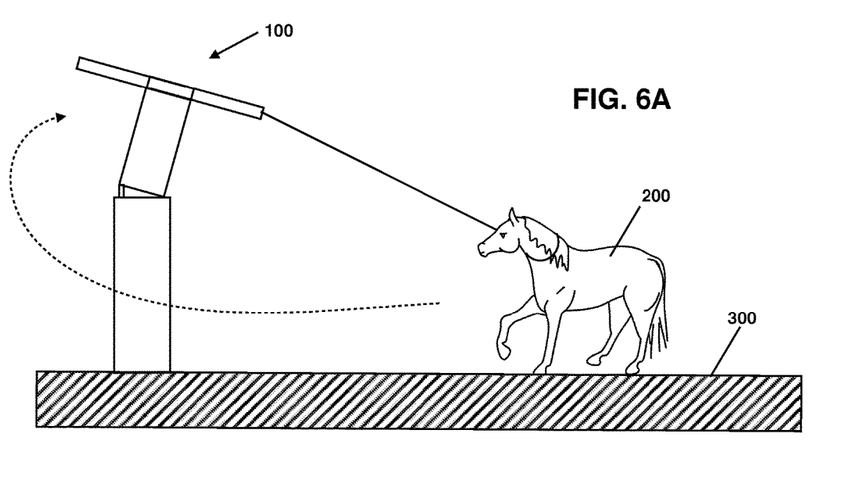
FIGS. 6A-6B illustrates a partial side view of the animal conditioning device of the disclosure described herein, shown at a tilted angle relative to a flat horizontal plane ground surface.
Figure 6B:
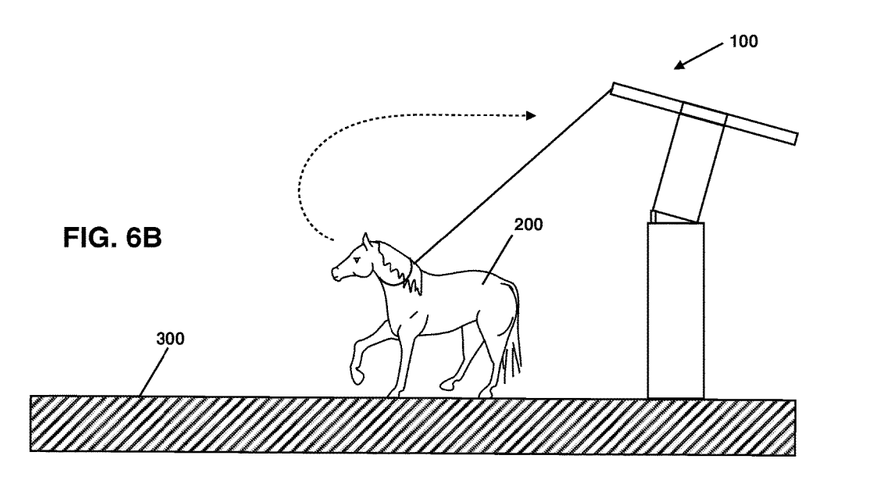

Referring to FIG. 6A-6B, an embodiment of an animal 200 is shown tethered to apparatus 100 of the disclosure described herein, wherein conditioning device 24 is tilted at an angle relative to horizontal ground 300. Here, while the conditioning device maintains its tilted configuration, the exertion force of animal 200 is modified as apparatus 100 causes the animal to circle around it (via the rotating movement of apparatus 100). For example, at the position depicted in FIG. 6A, animal 200 may need to exert less force than in the position depicted in 6B. Here, by continuously changing the arm's angle allows an animal tethered to it to move more naturally without being confined to a strictly-defined path. As the arm descends, the tether's increased slack allows the animal to choose its path. As the arm ascends and slack decreases, the animal is gradually guided forward to encourage it to move in a loosely-defined circular path. This way, the animal can be pulled gradually instead of being jerked abruptly. Alternatively, such a device may be used without a pivoting platform. In that case, the arms of the device would either remain at fixed positions relative to the ground, or they would utilize an additional motorized mechanism to change positions along the supporting structure, such as sliding up and down periodically. Here, it is contemplated within the scope of the disclosure described herein that the tilting of apparatus 100, or conditioning device 24, may also be incorporated with the use of the gates and panels with the animal in between them, as shown in FIG. 1A.

Figure 7A:
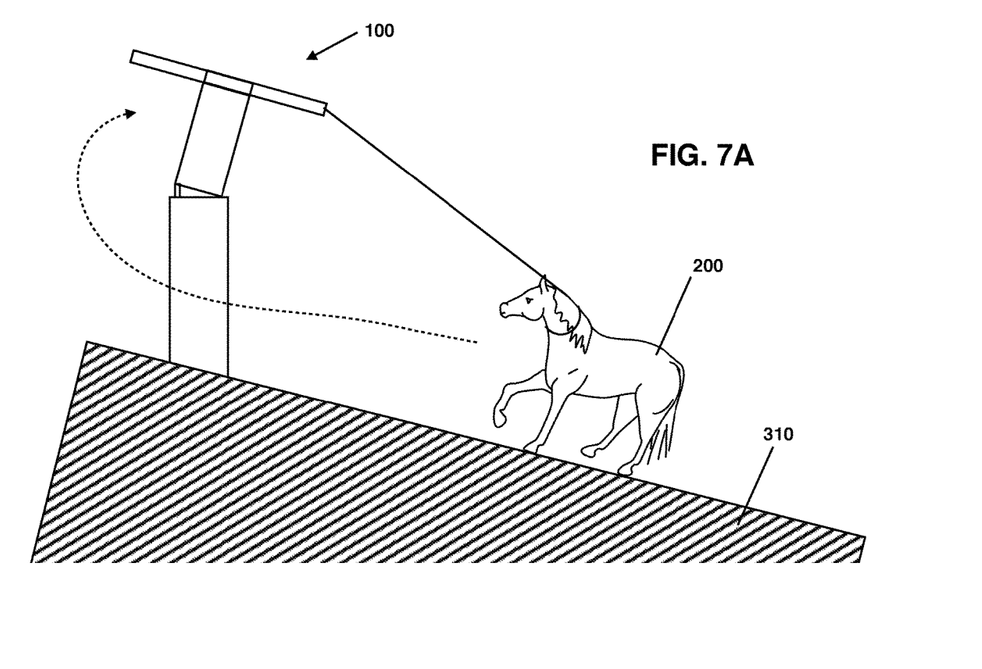
FIGS. 7A-7B illustrates a partial side view of the animal conditioning device of the disclosure described herein, shown at a tilted angle relative to an inclined or graded ground surface.
Figure 7B:
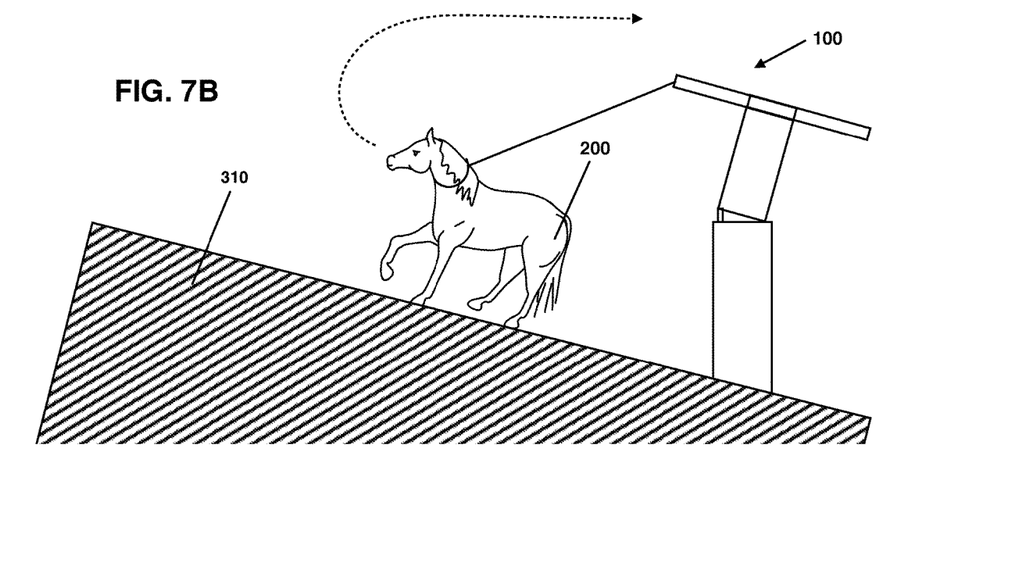

Referring to FIG. 7A-7B, another embodiment of an animal 200 is shown tethered to apparatus 100 of the disclosure described herein, wherein conditioning device 24 is tilted at an angle relative to graded or sloped ground 310. Here, while the conditioning device maintains its tilted configuration, the exertion force of animal 200 is modified as apparatus 100 causes the animal to circle around it (via the rotating movement of apparatus 100). For example, at the position depicted in FIG. 7A, animal 200 may need to exert more force to go up the sloped grade 310 than in the position depicted in 6B. Alternatively, since the tilt angle of apparatus 100 may be adjusted to match the slope of ground 310, animal 200 may be required to exert less force (or have less strain) since the arms or spokes of the apparatus are tilted to match that of ground 310. Here, by continuously changing the arm's angle allows an animal tethered to it to move more naturally without being confined to a strictly-defined path. As the arm descends, the tether's increased slack allows the animal to choose its path. As the arm ascends and slack decreases, the animal is gradually guided forward to encourage it to move in a loosely-defined circular path. This way, the animal can be pulled gradually instead of being jerked abruptly. Alternatively, such a device may be used without a pivoting platform. In that case, the arms of the device would either remain at fixed positions relative to the ground, or they would utilize an additional motorized mechanism to change positions along the supporting structure, such as sliding up and down periodically. Here, it is also contemplated within the scope of the disclosure described herein that the tilting of apparatus 100, or conditioning device 24, may also be incorporated with the use of the gates and panels with the animal in between them, as shown in FIG. 1A.

Here, The sloped grade method of the disclosure described herein may be compared to such as a human on an adjustable grade tread-mill, thereby engaging the body parts to exerting a pushing force uphill and a pulling back force or maneuver when going downhill, a different solution than merely going for a jog on a flat horizontal terrain. In addition, an animal being conditioned by apparatus 100, can also wear chips or monitoring devices that can report heart rate, temperature, or other stress related issues. Electronically, with use of RF signals, the chips and monitors will transmit to the controller or a master control panel, creating speed and duration change control. Here, the operating envelope window based on monitored health data can be adjustable. For example, if an animal's heart rate or temperature exceeds a certain rate, the controller can slow or stop the conditioning device 24, or flash a light or sound a horn, thereby alerting an attendant. In addition, because the sloped graded conditioning method of apparatus 100 creates compound traveling panel angles (suspended from arms or spokes), electronics such as MEMS, gyroscopes, accelerometers, or other sensors may be used to control actuators for vertical panel control. The electronics will receive voltage current from the center column, connected to the controller or master control panel. Because of the rotating assembly, a rotating buss bar may eliminate conductor fatigue. In addition, electrodes disposed on the panels or on the tether, may also provide low voltage electrical signals to each of the traveling panels or tether, providing a motivating stimulus to a reluctant balking animal.

In additional embodiments of the animal conditioning apparatus, there may be a low voltage current from the axle column to each traveling panel (one panel for each arm), to serve as motivation for a balking animal or horse. In addition, the animal conditioning apparatus may include a heart rate monitor and temperature-sensing data transmitted remote via RF to the main controller in order to automatically regulate or an emergency stop, among other functionality. Further, one or more monitors and sensors can be included to provide for recording information pertinent to each direction of travel. In addition, this recorded data may then be transmitted via Bluetooth or other wireless technology to the main controller or an independent receiver for evaluation, monitoring, and management. In addition, one or more cameras may be placed on the main axle column, focused on specific individual horses, or scanning for comparison, and then transmitted to the main controller unit, such as for speed regulation and duration. Here, the cameras may include any type of stereoscopic and infrared (IR) technology used to measure the animal's temperature, stride, and gate. In addition, the cameras may provide safety for the animal by transmitting instructions or automated commands to the main controller unit in the event of an emergency, such as when the animal is lying down.

In additional embodiments, the conditioning apparatus may have a cam relative to the extending arms that will then shorten and lengthen the control cable (not the gusset cable) relative to arm length. The control cable can then be attached to the upper most column, and connect to a pivoting and bearing mounted control arm that attaches to the traveling/moving panel, but only on one panel end. The other panel end can also be bearing mounted, providing freedom of panel angle change, but within confines of the cable length. A ballast can be created within the panel design to constantly create load on the panel managing cable. In addition, the length of the upper and upper most column can be important to the gusset cable angle, while the dimension of the upper most attaching point is important for the panel angle managing cable.

Since many possible embodiments may be made of the invention without departing from the scope thereof, it is to be understood that all matters herein set forth or shown in the accompanying drawings are to be interpreted as illustrative, and not in a limiting sense. While specific embodiments have been shown and discussed, various modifications may of course be made, and the disclosure described herein is not limited to the specific forms or arrangement of parts or method of assembly described herein, except insofar as such limitations are included in the following claims. Further, it will be understood that certain features and sub-combinations are of utility and may be employed without reference to other features and sub-combinations.

What is claimed is:

1. An animal conditioning apparatus, the apparatus comprising:
   an upright base having a first mounting interface;
   an upper shaft having a plurality of arms extending radially outward from the upper shaft;
   a lower shaft coupled to the upper shaft, wherein the lower shaft further comprises a second mounting interface; and
   a drive motor unit secured to the lower or upper shaft;
   wherein the drive motor unit is configured to rotate the upper shaft such that the arms rotate to guide one or more equine;
   wherein the second mounting interface is coupled to the first mounting interface at an offset angle relative to a horizontal plane, such that the arms are disposed at one or more offset angles relative to the horizontal plane.

2. The animal conditioning apparatus of claim 1, wherein the lower shaft is in a tilted configuration relative to the upright base.

3. The animal conditioning apparatus of claim 1, further comprising a drive belt or chain configured to drive and rotate the upper shaft.

4. The animal conditioning apparatus of claim 3, further comprising a housing for enclosing the drive belt or chain.

5. The animal conditioning apparatus of claim 1, further comprises an adjustable member between the first and second mounting interfaces.

6. The animal conditioning apparatus of claim 5, wherein the adjustable member is comprised of an adjustable jack.

7. The animal conditioning apparatus of claim 1, further comprising a pivoting hinge between the first and second mounting interfaces.

8. The animal conditioning apparatus of claim 1, wherein the first and second mounting interfaces are each comprised of a plate.

9. An animal conditioning apparatus, the apparatus comprising:
   an upright base having a first mounting interface;
   a top shaft disposed at an offset angle relative to a horizontal plane, the top shaft having a plurality of arms extending radially outward from the top shaft, wherein the arms are in a tilted configuration and disposed at one or more offset angles relative to the horizontal plane;
   a bottom shaft coupled to the top shaft, wherein the bottom shaft further comprises a second mounting interface; and
   a drive motor unit secured to the bottom or top shaft;
   wherein the drive motor unit is configured to rotate the top shaft such that the arms rotate to direct one or more animals in a roundabout path;
   wherein the first mounting interface is configured to couple to the second mounting interface.

10. The animal conditioning apparatus of claim 9, wherein the bottom shaft is in a tilted configuration relative to a horizontal plane.

11. The animal conditioning apparatus of claim 9, wherein the plurality of arms are further connected to one or more panels.

12. The animal conditioning apparatus of claim 9, wherein the plurality of arms are further connected to one or more tethers.

13. The animal conditioning apparatus of claim 9, further comprising a housing for at least partially enclosing the motor unit.

14. The animal conditioning apparatus of claim 9, further comprising a hinge between the first mounting interface and second mounting interface.

* * * * *